UNITED STATES PATENT OFFICE.

FRIEDRICH WALKER, OF GUTTENBERG, NEW JERSEY.

IMPROVEMENT IN PROCESSES OF COLORING WALKING-CANES.

Specification forming part of Letters Patent No. 181,610, dated August 29, 1876; application filed May 6, 1876.

*To all whom it may concern:*

Be it known that I, FRIEDRICH WALKER, of Guttenberg, Hudson county, State of New Jersey, have invented a new and useful Process for Coloring Walking-Canes, which process is described in the following specification.

In carrying out my invention I make use of sticks or canes of thorn in their natural state, cut at certain lengths, with all branches cut off near to the stem. These canes I pile up side by side in a vessel or cask, so that one cane covers the other. Into this vessel or cask I admit steam, which softens the bark, and as the canes press upon each other the branch stubs are pressed into the softened bark, which thus is perforated in many places. As a matter of course, the more canes are placed in the vessel the heavier the pressure will be on the canes. After the steam is cut off from the vessel at a given time, generally after a day's or half a day's exposure, a mixture of iron and acid is admitted into the vessel, covering the canes, and steam is again conducted into the vessel. This mixture is made by placing old iron, such as old nails, horseshoes, scrap-iron, &c., in sour beer, vinegar, or any other acid.

By the action of the steam and the iron and acid mixture on the canes, a coloring matter is imparted to the wood under the bark, which obtains different hues or stripes, according to the strength of the mixture, and to the time the canes are exposed to the influence of the steam and the aforesaid mixture. After the canes have thus been treated the bark is removed, and they are varnished and ready for use.

Having thus described my invention, I desire to claim—

The process of coloring walking sticks or canes by the action of steam and a mixture of iron and acid, substantially as described and set forth.

This specification signed this 13th day of March, 1876.

FRIEDRICH WALKER.

Witnesses:
 RICHARD GERNER,
 FRANKLIN BARRETT.